(12) United States Patent
Scarinci et al.

(10) Patent No.: US 7,841,181 B2
(45) Date of Patent: Nov. 30, 2010

(54) GAS TURBINE ENGINE COMBUSTION SYSTEMS

(75) Inventors: Thomas Scarinci, Mont-Royal (CA); Anthony John Moran, Nuneaton (GB); Lynn Ivor Thomas Steward, Ile Bizard (CA); Bryn Jones, Derby (GB)

(73) Assignee: Rolls-Royce Power Engineering plc, Derby (GB)

( * ) Notice: Subject to any disclaimer, the term of this patent is extended or adjusted under 35 U.S.C. 154(b) by 404 days.

(21) Appl. No.: 11/879,945

(22) Filed: Jul. 19, 2007

(65) Prior Publication Data
US 2008/0006033 A1 Jan. 10, 2008

Related U.S. Application Data

(63) Continuation of application No. PCT/US2006/035785, filed on Sep. 13, 2006.

(60) Provisional application No. 60/717,117, filed on Sep. 13, 2005.

(51) Int. Cl.
*F02C 7/08* (2006.01)
*F02C 1/00* (2006.01)

(52) U.S. Cl. .......................................... 60/738; 60/747

(58) Field of Classification Search ................ 60/737, 60/738, 746–748
See application file for complete search history.

(56) References Cited

U.S. PATENT DOCUMENTS

| | | | |
|---|---|---|---|
| 2,999,359 A | 9/1961 | Murray | |
| 4,193,260 A | 3/1980 | Carlisle et al. | |
| 4,271,675 A * | 6/1981 | Jones et al. | 60/737 |
| 4,292,801 A * | 10/1981 | Wilkes et al. | 60/776 |
| 4,901,524 A * | 2/1990 | Shekleton et al. | 60/39.465 |
| 5,038,558 A * | 8/1991 | Sohma et al. | 60/39.6 |
| 5,088,287 A * | 2/1992 | Shekleton | 60/740 |
| 5,319,935 A | 6/1994 | Toon et al. | |
| 5,323,604 A | 6/1994 | Ekstedt et al. | |
| 5,473,881 A * | 12/1995 | Kramnik et al. | 60/772 |
| 5,640,851 A | 6/1997 | Toon et al. | |
| 5,687,571 A | 11/1997 | Althaus et al. | |
| 5,749,219 A | 5/1998 | DuBell | |
| 5,797,267 A | 8/1998 | Richards | |
| 5,816,050 A | 10/1998 | Sjunnesson et al. | |
| 6,082,111 A | 7/2000 | Stokes | |
| 6,253,555 B1 | 7/2001 | Willis | |
| 6,272,840 B1 | 8/2001 | Crocker et al. | |

(Continued)

FOREIGN PATENT DOCUMENTS

EP 1 524 473 A1 4/2005

(Continued)

OTHER PUBLICATIONS

European Patent Office, Munich, Germany, Office Action, Jan. 19, 2010, Application No. 06836119.5, Rolls-Royce Canada Limited.

(Continued)

*Primary Examiner*—Charles G Freay
(74) *Attorney, Agent, or Firm*—Krieg DeVault LLP

(57) ABSTRACT

One embodiment is a unique gas turbine engine combustion chamber including primary and secondary burning zones. Other embodiments include unique gas turbine engine apparatuses, systems, methods, and combinations.

8 Claims, 7 Drawing Sheets

U.S. PATENT DOCUMENTS

| | | | |
|---|---|---|---|
| 6,286,298 B1 | 9/2001 | Burrus et al. | |
| 6,332,313 B1 | 12/2001 | Willis et al. | |
| 6,345,505 B1 | 2/2002 | Green | |
| 6,381,964 B1 | 5/2002 | Pritchard, Jr. et al. | |
| 6,389,815 B1 | 5/2002 | Hura et al. | |
| 6,412,282 B1 | 7/2002 | Willis | |
| 6,418,726 B1 | 7/2002 | Foust et al. | |
| 6,497,103 B2 | 12/2002 | Johnson et al. | |
| 6,513,334 B2 | 2/2003 | Varney | |
| 6,684,642 B2 | 2/2004 | Willis et al. | |
| 6,732,527 B2 | 5/2004 | Freeman et al. | |
| 6,837,052 B2 * | 1/2005 | Martling | 60/737 |
| 6,848,260 B2 | 2/2005 | North et al. | |
| 6,968,692 B2 | 11/2005 | Chin et al. | |
| 6,986,255 B2 * | 1/2006 | Smith et al. | 60/776 |
| 2002/0020173 A1 * | 2/2002 | Varney | 60/737 |
| 2002/0148231 A1 | 10/2002 | Willis et al. | |
| 2002/0148232 A1 | 10/2002 | Willis et al. | |
| 2003/0145576 A1 | 8/2003 | Scarinci et al. | |
| 2004/0060301 A1 | 4/2004 | Chen et al. | |
| 2004/0144098 A1 | 7/2004 | Willis et al. | |
| 2007/0141519 A1 | 6/2007 | Lauer | |

FOREIGN PATENT DOCUMENTS

| | | |
|---|---|---|
| GB | 2 013 788 A | 8/1979 |
| GB | 2 292 793 A | 3/1996 |
| JP | 60 0176333 A | 1/1985 |
| WO | WO 2007/033306 | 3/2007 |

OTHER PUBLICATIONS

European Patent Office, Munich, Germany, Office Action, Sep. 25, 2009, Application No. 06836119.5, Rolls-Royce Canada Limited.
International Bureau of WIPO, International Preliminary Report on Patentability and Written Opinion, Mar. 18, 2008, International Application No. PCT/US2006/035785 Rolls-Royce Corporation.
ISA/US, International Search Report, Apr. 3, 2007, International Application No. PCT/US06/35785 Rolls-Royce Corporation.

* cited by examiner

GAS TURBINE ENGINE COMBUSTION SYSTEMS

CROSS REFERENCE

The present application is a continuation of PCT Patent Application No. PCT/US2006/035785 filed Sep. 13, 2006, which claims the benefit of U.S. Provisional Patent Application No. 60/717,117 filed Sep. 13, 2005, each of which is incorporated herein by reference.

BACKGROUND

The present inventions relate generally to gas turbine engine combustion apparatuses, systems, and methods, and more particularly, but not exclusively, to low emissions combustion systems for gas turbine engines which include premixing of fuel and air.

Gas turbine engines are an efficient source of useful energy and have proven useful for electricity generation, to drive pumping sets, to propel and power aircraft, as well as for other uses. One aspect of gas turbine engines is that they include combustor apparatuses, systems and methods which presently suffer from a number of disadvantages, limitations, and drawbacks including, for example, those respecting efficiency, emissions, fuel richness and leanness, quenching, variable power output, complexity, part count, cost and others. Thus, there is a need for the unique and inventive gas turbine engine combustion apparatuses, systems, and methods.

SUMMARY

One embodiment is a unique gas turbine engine combustion system including primary and secondary burning zones. Other embodiments include unique gas turbine engine apparatuses, systems, and methods. Further embodiments, forms, objects, features, advantages, aspects, and benefits shall become apparent from the following description and drawings.

DETAILED DESCRIPTION OF PREFERRED EMBODIMENTS

Figure 1:
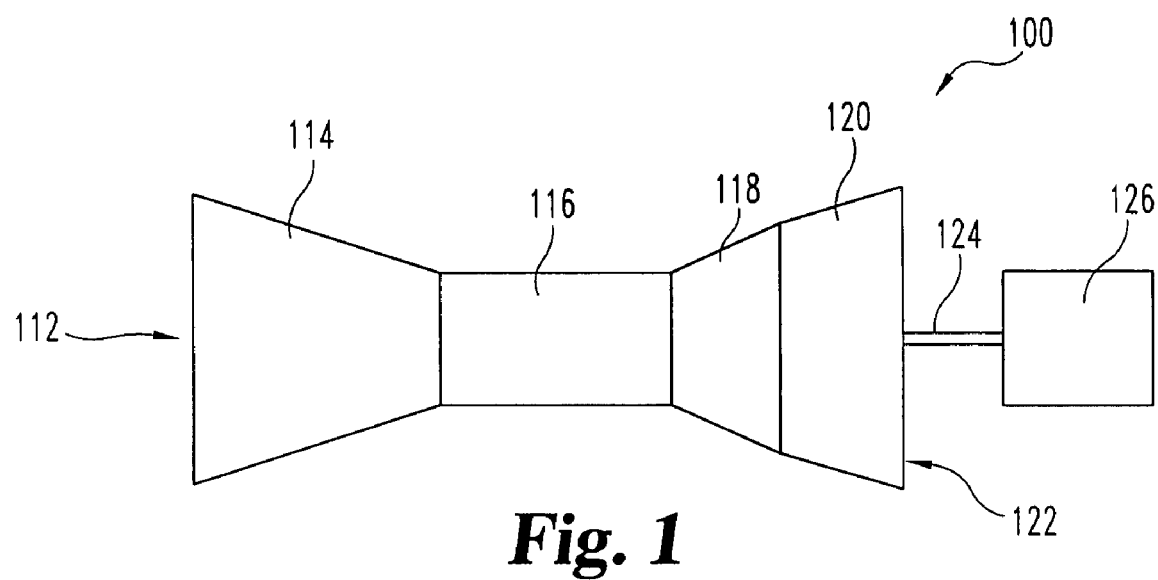
FIG. 1 is a schematic diagram of a gas turbine engine.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of, the principles of the invention as illustrated therein being contemplated as would normally occur to one skilled in the art to which the invention relates.

With reference to FIG. 1, there is illustrated a schematic representation of a gas turbine engine 100. Gas turbine engine 100 includes working fluid inlet 112, compressor section 114, combustor section 116, turbine section 118, power turbine section 120, and exhaust output 122. The flow of working fluid through engine 100 is generally from left to right. Working fluid flowing into inlet 112 is compressed by compressor section 114 and compressed working fluid flows to combustor section 116. The combustor section 116 is illustrated generically and could be any of a variety of configurations including a can combustor, a tubular combustor, a silo combustor, an annular combustor, a can annular combustors. In one form of the present invention the working fluid is air. Combustor section 116 combusts fuel with the pressurized working fluid to release a high temperature gas flow from which work is extracted in the turbine(s). Energy from the combustion of the fuel and working fluid drives turbine sections 118 and 120. Exhaust is released though exhaust output 122 and can optionally be routed for further use. Turbine section 118 is arranged to drive the compressor section 114 via a shaft (not illustrated). Power turbine section 120 is arranged to drive shaft 124 which drives load 126. Load 126 could be any of a multitude of devices for which gas turbine engines have proven useful including, for example, an electrical generator or generation system, a pump, pumping set, or pumping system, a variety of other machines or industrial devices, or a naval or aircraft propulsion systems.

Figure 2:
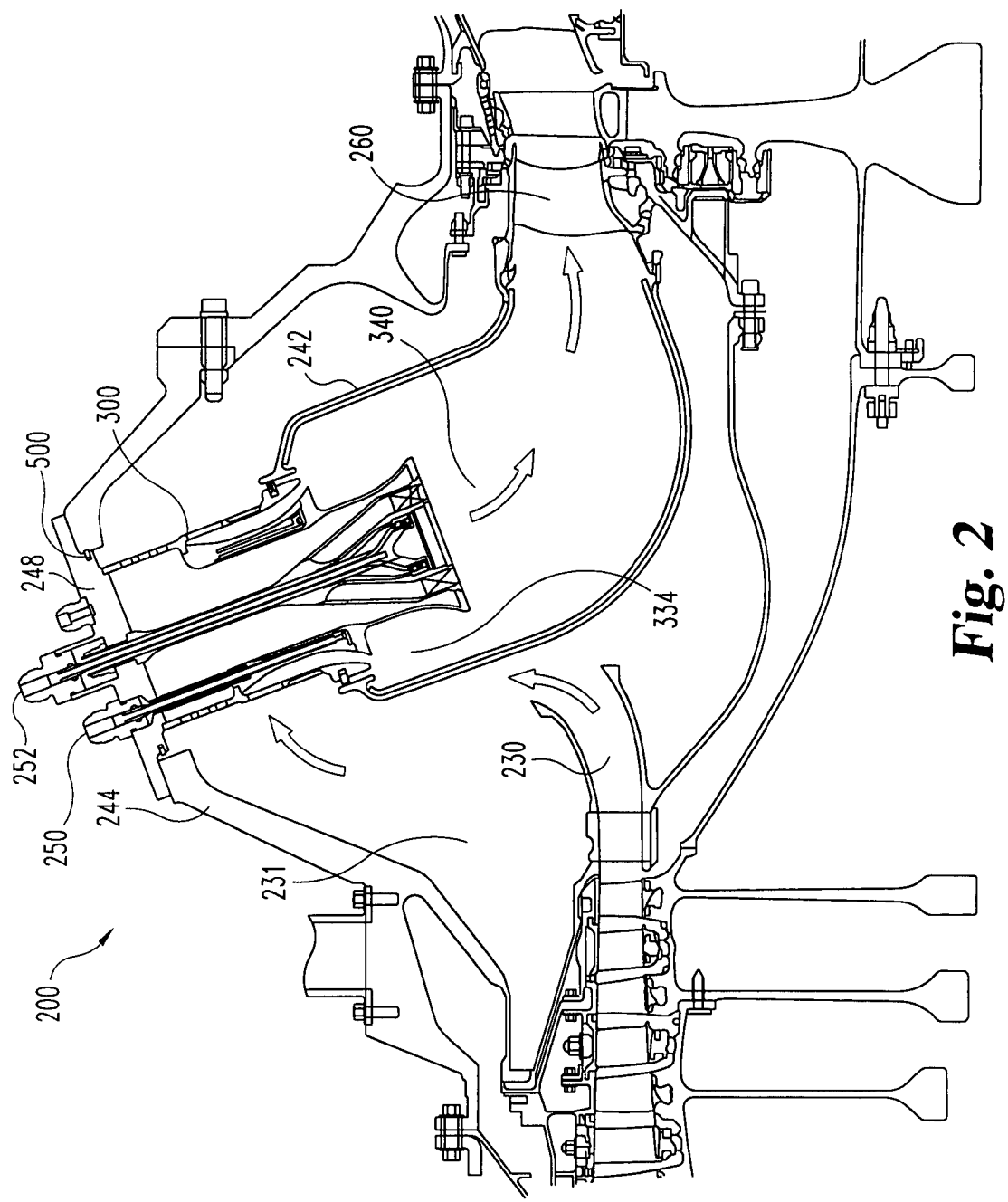
FIG. 2 is a schematic diagram of a portion of a gas turbine combustion system.

With reference to FIG. 2 there is illustrated a schematic representation of another embodiment of a gas turbine combustion system. The gas turbine includes a diffuser 230 from which the compressed working fluid is discharged into a plenum 231. As previously discussed a preferred working fluid is air. The compressed working fluid from the diffuser 230 flows towards a gas turbine combustion device 300, one embodiment of the combustion device 300 will be subsequently described in greater detail in association with FIG. 3. Compressed working fluid enters the combustion device 300 via a number of air inlet ports. Fuel enters the combustion device 300 via at least two distinct pathways, 250 and 252 in FIG. 2. In one form of the invention there is contemplated a combustion device including more than two distinct fuel pathways. In one form combustion device 300 mixes fuel and air prior to discharging the fuel and air mixture to two distinct combustion zones, 334 and 340. The present inventions contemplate that the air and fuel mixing is intended to be defined broadly unless specified to the contrary and may include, but is not limited to, partial mixing, thorough mixing and/or complete mixing. Primary combustion zone 334 is located upstream of secondary combustion zone 340.

In one form combustion system 200 includes an annular structural casing 244 and an annular flame tube 242. The reader should appreciate that there are a finite number of combustion devices 300 distributed circumferentially around the annular geometry of structural casing 244 and annular flame tube 242. In one form the combustion devices 300 are inserted through discrete openings 500, for example 16—of, in the structural casing and the flame tube. The present invention contemplates that there are one or more combustion devices located around the annular geometry of the structural casing and in a preferred form there are a plurality of combustion devices located around the annular geometry of the structural casing. In one form each of the combustion devices 300 are mounted to the structural casing 244 via a solid bolted flange 248. However, other methods of mounting the combustion devices are contemplated herein.

Figure 3:
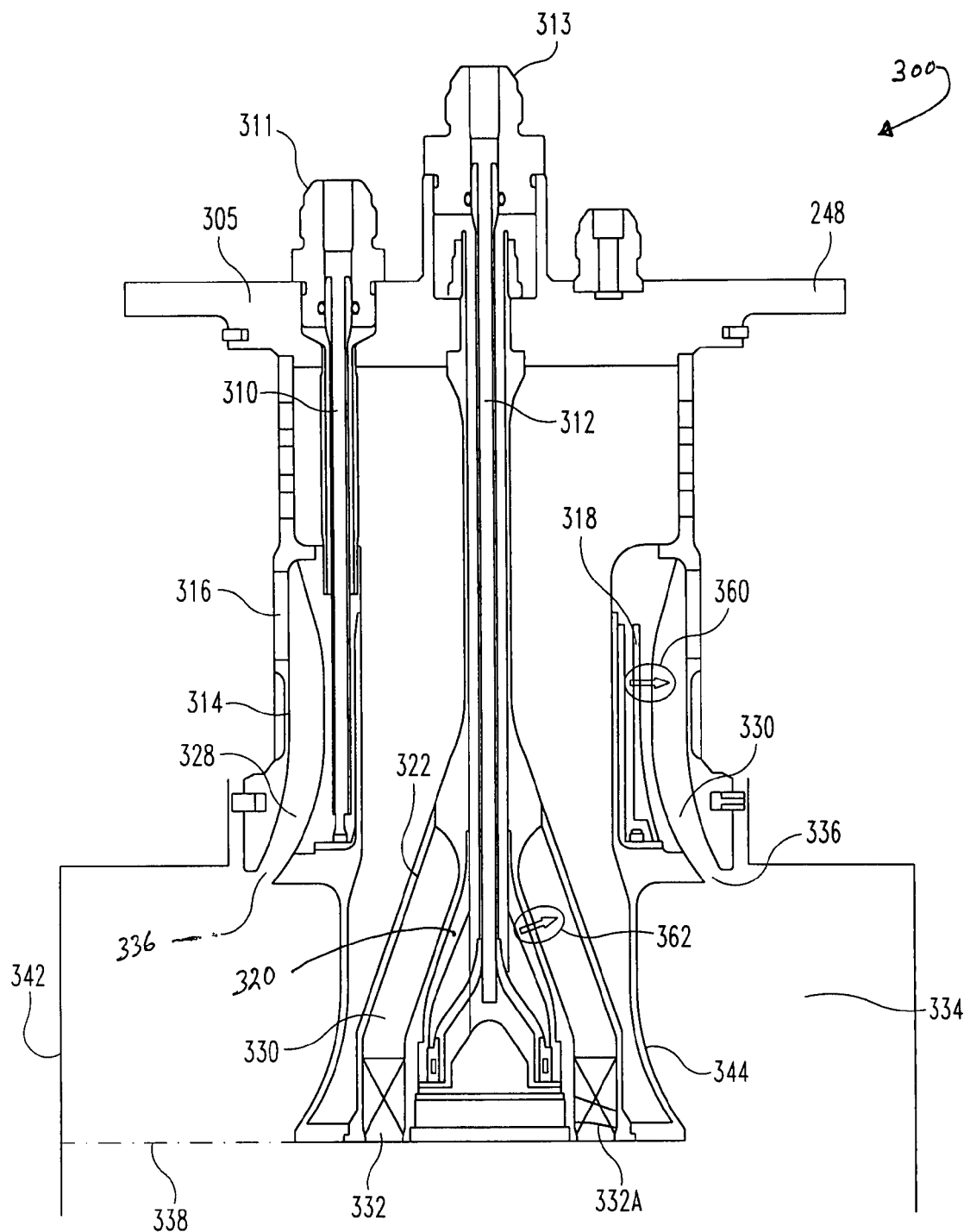
FIG. 3 is a schematic diagram of a portion of a gas turbine engine combustion system.

With reference to FIG. 3 there is illustrated a portion of one embodiment of a gas turbine engine combustion device 300. Combustion device 300 includes primary fuel feed pipe 310 and secondary fuel feed pipe 320 which route fuel from a fuel supply (not illustrated), and extend through housing 305 to ducts 328 and 330, respectively. Fuel injection occurs through openings, indicated by arrows 360 and 362 leading from primary fuel manifold 318 and secondary fuel manifold 320 to duct 328 and duct 330, respectively. The supply of fuel delivered by pipes 310 and 320 can be controlled by valves, connected to fittings 311 and 313 which could be electronically, mechanically, or electro-mechanically controlled valves. In one form the controlled valves are preferably on-off valves which simply turn fuel supply on or off, but could also be variable valves or metering valves which deliver variable amounts of fuel depending upon their settings or any other type of gas turbine engine fuel valve. While FIG. 3 illustrates two fuel supplies leading to two ducts, it should be appreciated that a greater number of fuel supplies and ducts are contemplated in various embodiments. For example, a third fuel supply and duct configuration could be present in an embodiment including an additional combustion zone.

Combustion device 300 also includes primary air intakes 314 and 316 and secondary air intakes 322 which intake compressed working fluid flowing from a gas turbine engine compressor. Intakes 314 and 316 route compressed working fluid to duct 328 and intakes 322 route compressed working fluid to duct 330. In one form of the invention the fuel and air provided to ducts 328 and 330 is well mixed, by the turbulent flow structure that prevails in ducts 328 and 330. Mixed fuel and air is output from duct 328 at opening 336 which leads to a combustion chamber defined in part by wall 342 which may include a combustion liner on its interior surface. Mixed fuel and air is output from duct 330 at opening 332 of centerbody 344 which also leads to the combustion chamber. The output of opening 336 is to primary combustion zone 334 which extends downstream toward the outlet end of the combustion chamber to about a plane 338 or to a plane further upstream or generally to the left in FIG. 3 as the page is viewed in a portrait profile. The output of opening 332 is to secondary combustion zone 340 which extends downstream, or generally to the right in FIG. 3 as the page is viewed in a portrait profile, toward the outlet of the primary combustion zone from about plane 338. The openings 336 and 332 may be annular fluid flow openings or may be discrete spaced apart fluid flow openings. In one form opening 332 includes a plurality of discrete flow obstructions 332a that create a plurality of discrete fuel and working fluid exit jets.

Figure 4:
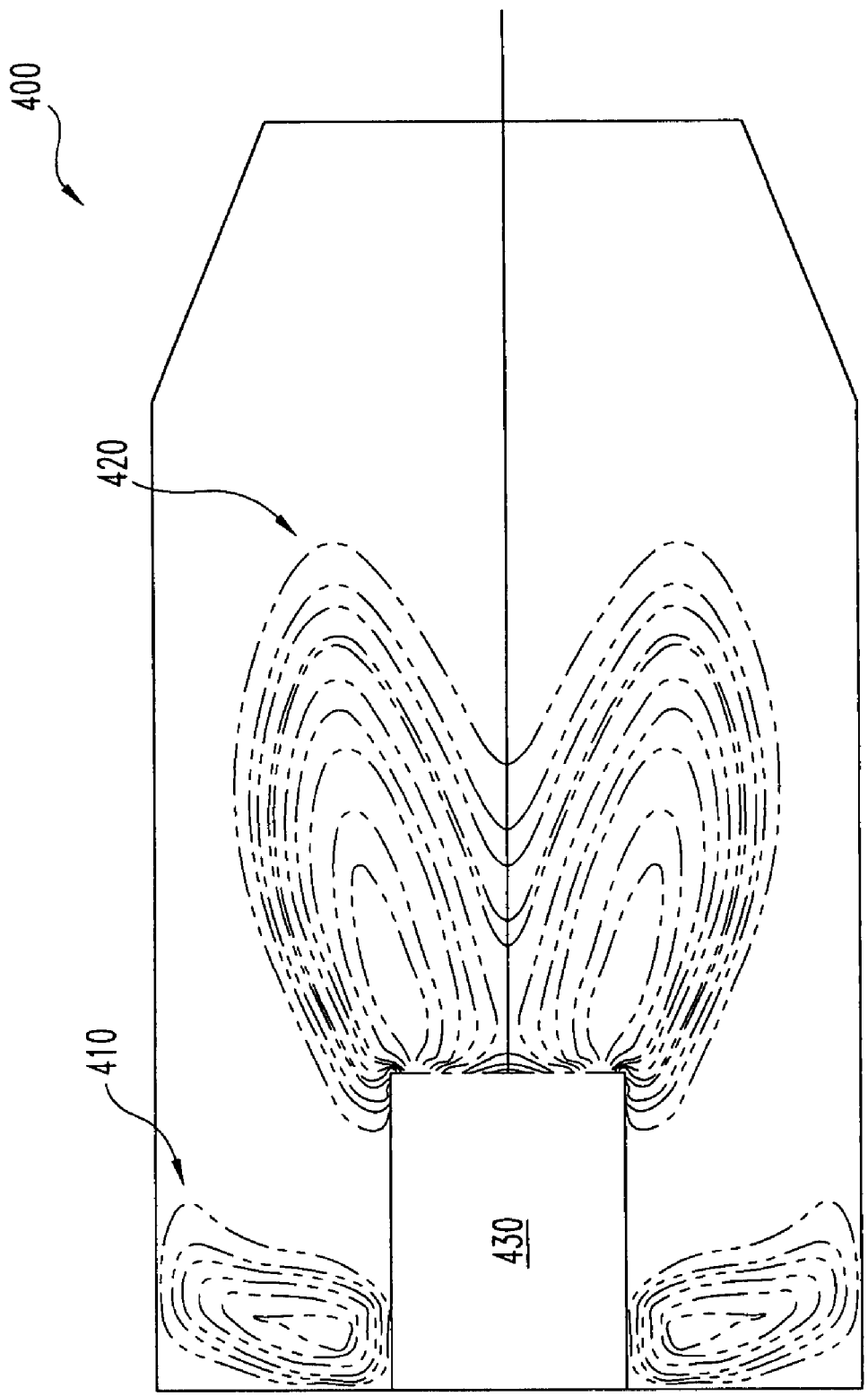
FIG. 4 is an illustration of one embodiment of combustion flowfields associated with a gas turbine engine combustion system.

With reference to FIG. 4 there is illustrated one form of a combustion flowfield 400. Flowfield 400 includes a primary premixed combustion zone 410 and secondary combustion zone 420 which are both located in the annular volume defined within the annular flame tube 242. The overall flow direction of FIG. 4 is from left to right with the primary and secondary flames being fed a well mixed fuel and air mixture, for example as described above in connection with FIG. 3. As illustrated in FIG. 4, the primary flame 410 is located in a primary combustion zone which is located upstream from a secondary combustion zone in which secondary flame 420 is located. In FIG. 4, primary combustion zone is a ring-like region that surrounds centerbody 430 (i.e., centerbody 344 in FIG. 3). In one form the primary combustion zone is a stable burning zone including a pair of counter-rotating vortex rings.

The primary combustion process is essentially completed in the primary combustion zone and thus essentially only the products of combustion pass to the secondary combustion zone into which the secondary fuel-air mixture is introduced. Thus the primary and secondary flames are separated from one another. In a preferred form the distance between the discharge from the primary fuel and working fluid delivery and the secondary fuel and working fluid delivery is chosen to be sufficient to ensure that the primary combustion process is completed prior to the introduction of the secondary fuel and working fluid. The secondary flame is surrounded by the hot combustion products of the primary flame which ignite the secondary flame obviating the need for a separate ignition for the secondary flame, though one could be present. Additionally, when the supply of fuel to the secondary flame is shut off, air flowing to the secondary combustion zone is not capable of quenching the primary combustion reaction or otherwise interfering with the desired ratio of fuel and air. This gives a wide emissions compliance range, for CO and NOx and other emissions. Additionally because the primary burning zone is located upstream of the secondary zone, ignition of the secondary combustion zone occurs spontaneously as soon as fuel is introduced to the secondary circuit. This gives very wide stable operating additions for the secondary system.

Figure 5:
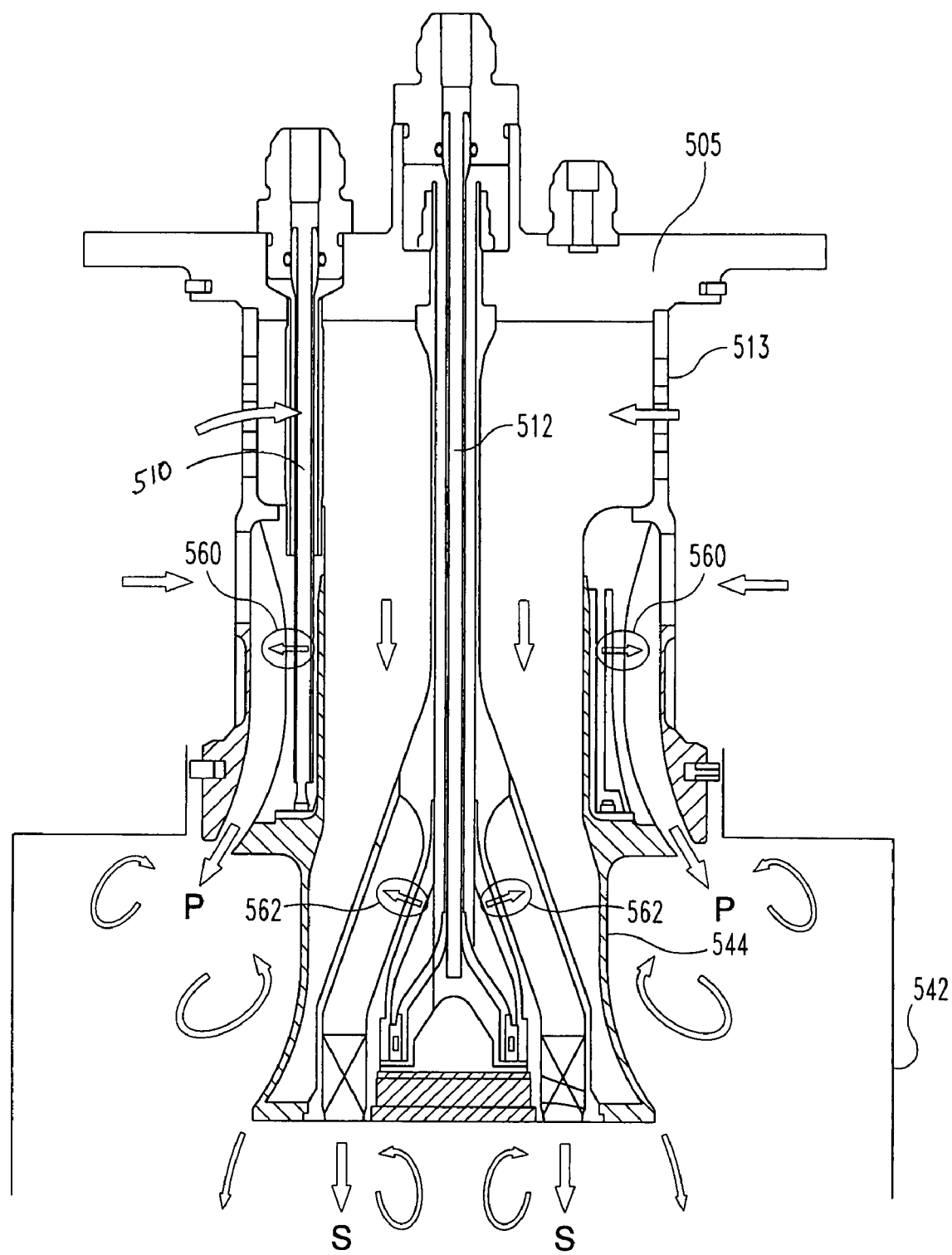
FIG. 5 is a schematic diagram of a portion of another embodiment of a gas turbine engine combustion system.

With reference to FIG. 5 there is illustrated additional information regarding a combustion device which is substantially similar to combustion device 300. Features of the combustion device are substantially similar to those of device 300 and are illustrated herein with reference numerals increased by 200. The combustion device includes a perforated cylinder 513 which connects centerbody 544 and housing 505. In FIG. 5, there is illustrated the general flow direction in the primary combustion zone as arrows P and general flow direction in the secondary combustion zone as arrows S. As illustrated in FIG. 5, the secondary fuel air mixture is injected away from any combustion wall and will not form CO by wall quenching.

Figure 6:
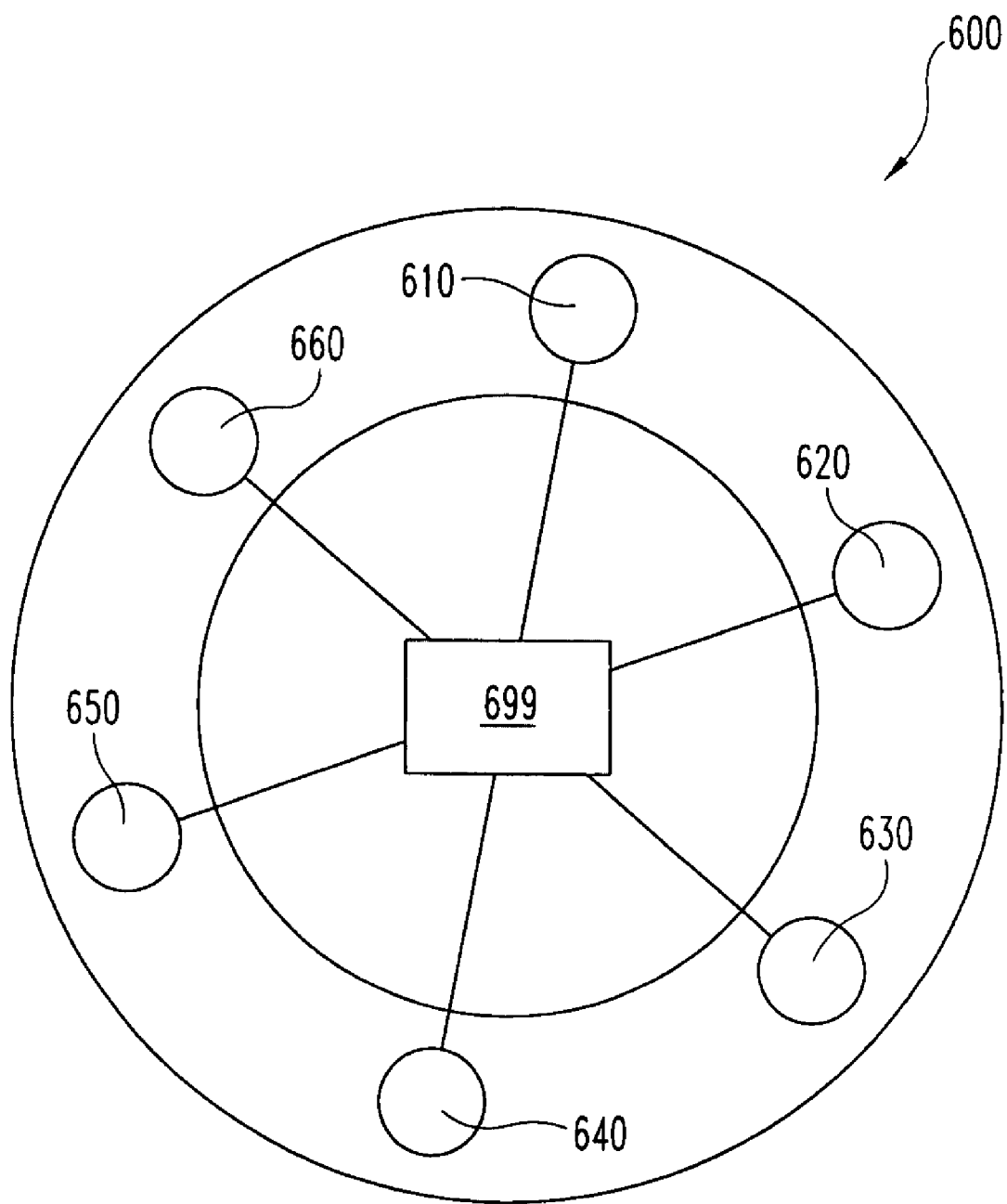
FIG. 6 is a schematic diagram of a system including multiple gas turbine engine combustor devices.

With reference to FIG. 6 there is illustrated a generic schematic of a gas turbine engine combustion system 600. Gas turbine engine combustion system 600 includes six combustion devices 610, 620, 630, 640, 650, and 660 which are arranged in a generally annular configuration. Combustion devices 610, 620, 630, 640, 650, and 660 could be the same or similar to the devices described and illustrated elsewhere herein. While combustion system 600 is illustrated as including six combustion devices, it is contemplate that greater or fewer numbers of such devices, for example, two, three, four, five, seven, eight, sixteen or greater numbers of devices could be used. As also illustrated in FIG. 6, controller 699 is operatively coupled to each of the devices and can control the fuel supply to a primary and secondary combustion zone of each device.

Various embodiments of the foregoing combustion devices and others can be operated in a low emissions combustion system for an industrial gas turbine, for example, in connection with electricity generation. Once operation begins, the primary burning zone is typically operating at all times, although it has the option of being switched on or off if a particular engine cycle requires it. The secondary burning zone is typically only operating at high power and is not operating at low power, that is, the secondary burning zone can be turned off or on as desired power increases or decreases. In embodiments including multiple combustion devices, the primary and secondary combustion zones can be turned on individually and successively, for example, turning on one primary combustion zone after another until all primary combustion, zones are ignited or simply turning on all primary combustion zones initially. The secondary combustion zone can then be ignited one after another until a desired engine operation state is reached or until all secondary combustion zones are operating. Thus, the selective switching of secondary circuits can be used to modulate the output power of the engine. These fuel staging approaches can also be used to regulate emissions, for example, by turning secondary combustion zones on and off to regulate overall combustion temperature. Through combustion temperature regulation, emissions such as CO and NOx can be regulated.

Figure 7:
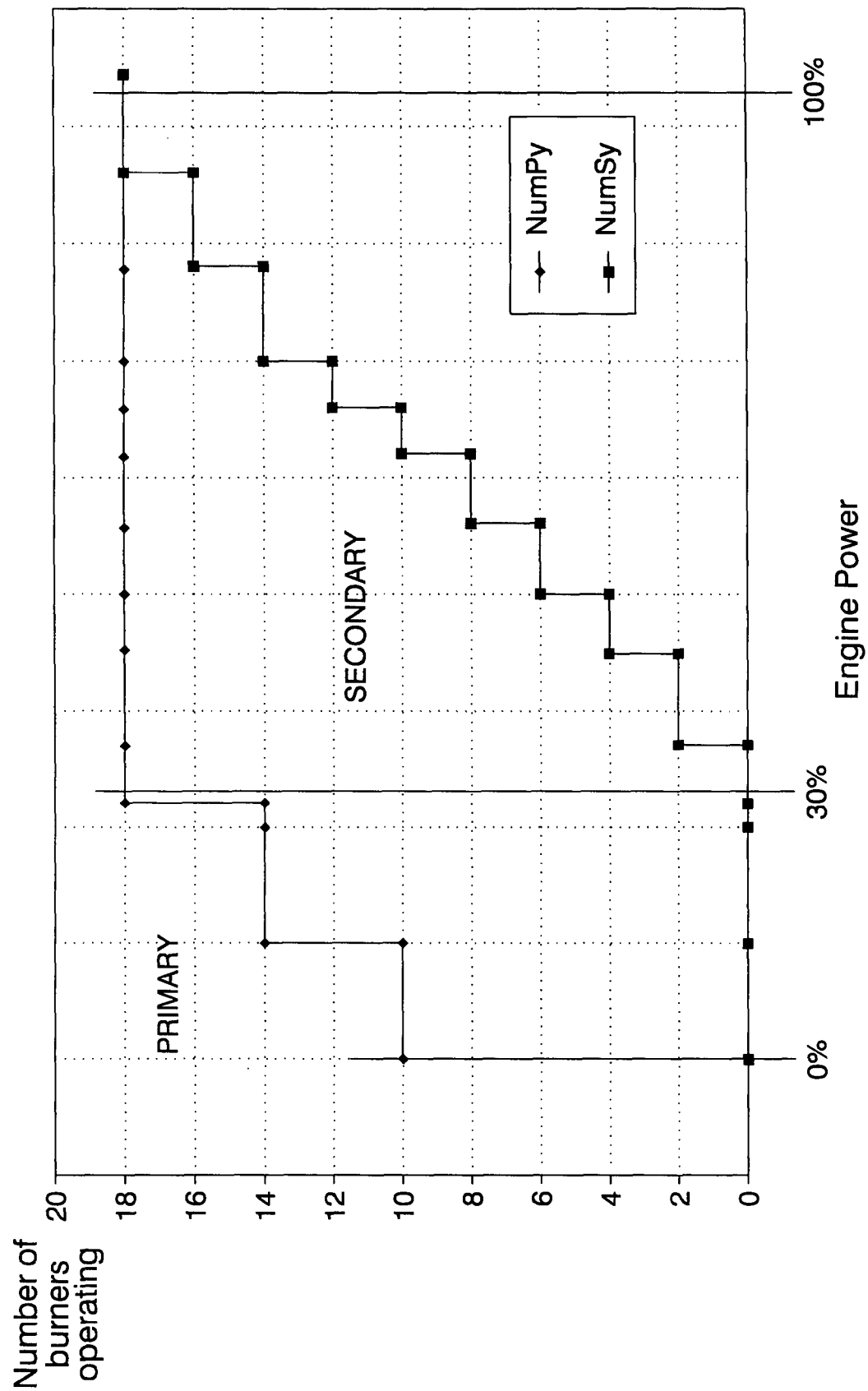
FIG. 7 is a schematic of the staging of serially-staged combustor devices as the engine varies its power output.

In one embodiment, the primary burning zone alone is operating an engine output from about 0% to 30% maximum output. The secondary burning zone is operating at higher power levels, for example, higher than 30% power, and is not operating at low power. When several injectors are installed in the engine, the selective switching of the secondary circuits can be used for modulation of engine power, while allowing a tight control of flame temperatures. For example, in an embodiment including 18 injectors, the injectors can be turned on in groups of two providing nine switch points between low and high power. Data for one embodiment including 18 injectors is illustrated in FIG. 7.

One embodiment is a system comprising a gas turbine engine combustion chamber including a primary combustion zone and a secondary combustion zone, a first air and fuel discharge in flow communication with the primary combustion zone, a second air and fuel discharge in flow communication with the secondary combustion zone, and a centerbody extending into the combustion chamber, wherein the primary combustion zone at least partially surrounds the centerbody at a location upstream from the secondary combustion zone. In another embodiment the second air and fuel discharge comprise an aperture located on the centerbody. Another embodiment includes a valve operable to selectably turn on and off a supply of fuel to the second air and fuel discharge, when said supply is turned off the second discharge is operable to discharge air. In a further embodiment when a supply of fuel to the second discharge is turned off, air discharge from the second discharge does not quench the first combustion zone. In an additional embodiment the second discharge is directed away from the first combustion zone. Another embodiment includes means for mixing air and fuel for discharge. A further embodiment includes a controller for controlling supply of fuel to the second discharge. Additional systems include portions or combinations of the foregoing. Further embodiments include apparatuses and methods similar to the foregoing.

Another embodiment is a system comprising: a gas turbine engine combustion chamber including a primary combustion zone located upstream from a secondary combustion zone; a centerbody extending into the combustion chamber; a first air and fuel discharge adapted for delivering a first premixed air and fuel charge into the primary combustion zone; a second air and fuel discharge adapted for delivering a second premixed air and fuel charge into the secondary combustion zone; and the primary combustion zone at least partially surrounds the centerbody at a location upstream from the secondary combustion zone and a primary combustion process is substantially completed prior to the second fuel and air discharge. Further embodiments include apparatuses and methods similar to the foregoing.

Another embodiment is an apparatus including a gas turbine engine combustion chamber including a liner and a combustion output end, a primary fuel and air injection circuit including an output to a primary burning region of the combustion chamber, and a secondary fuel and air injection circuit including an output to a secondary burning region of the combustion chamber, wherein the first output is located closer to the liner than the second output, and the second output is located closer to the combustion output end than the first output. In a further embodiment the first fuel and air injection circuit includes an air intake and a fuel pipe leading to an air and fuel mixing duct, and the duct leads to the first fuel and air output. In an additional embodiment the output of the secondary fuel and air injection circuit is annular. In a further embodiment the output of the secondary fuel and air injection circuit includes a number of openings arranged in a ring-like configuration. In another embodiment the first output is located at an end of the combustion chamber. In an additional embodiment the second output in located on a centerbody extending into the combustion chamber toward the output end. In another embodiment the injection circuits include means for mixing air and fuel. A further embodiment includes means for routing air and fuel to the outputs. Another embodiment includes several apparatuses, which could be the same or similar to one or more of the foregoing apparatuses, and further includes a controller for turning on and off a supply of fuel to the secondary output of each of said apparatuses. Additional apparatus include portions or combinations of the foregoing. Further embodiments include systems and methods similar to the foregoing.

A further embodiment is a method of operating a gas turbine engine including a plurality of combustion devices, each device including a primary burning zone and a secondary burning zone which includes burning fuel in only the primary burning zones to generate a first engine output, burning fuel in a secondary burning zone to generate a second engine output, and, burning fuel in an additional secondary burning zone to generate a third engine output. An additional embodiment includes burning fuel in at least three secondary burning zones to generate a fourth engine output, wherein the third engine output includes greater engine output power than the first engine output. Another embodiment includes controlling fuel in a secondary burning zone based upon a signal for change of engine output power. In a further embodiment the engine outputs include emissions parameters. Additional methods include portions or combinations of the foregoing. Further embodiments include apparatuses and systems similar to the foregoing.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A gas turbine engine combustion system comprising:
a combustion device including
a combustion chamber including a primary combustion zone and a secondary combustion zone,
a centerbody extending into the combustion chamber, the primary combustion zone surrounding the centerbody at a location upstream from the secondary combustion zone, a first air and fuel discharge adapted for delivering a first premixed air and fuel charge into the primary combustion zone, and a second air and fuel discharge adapted for delivering a second premixed air and fuel charge into the secondary combustion zone;

wherein the first air and fuel discharge includes an annular mixing duct leading to an annular opening surrounding the centerbody and outputting to the primary combustion zone, the second air and fuel discharge includes an annular mixing duct leading to an annular opening at a downstream end of centerbody outputting to the secondary combustion zone, and a primary combustion process in the primary combustion zone is substantially completed prior to the second fuel and air discharge.

2. The gas turbine engine combustion system of claim 1 wherein the system includes a plurality of the combustion devices arranged in a generally annular configuration, and a controller operable to control fuel supply to the primary combustion zone and the secondary combustion zone of each of the plurality of combustion devices.

3. The gas turbine engine combustion system of claim 2 wherein the controller is operable to increase engine power by first successively turning on primary combustion zones until all primary combustion zones are ignited, and second successively turning on secondary combustion zones until all secondary combustion zones are ignited.

4. The gas turbine engine combustion system of claim 2 wherein the controller is operable in a first mode providing a first power output with combustion in the primary combustion zone in fewer than all of the plurality of the combustion devices and not in the secondary combustion zone of any of the plurality of the combustion devices, and in a second mode providing a second power output greater than the first power output with combustion in the primary combustion zone in additional ones of the plurality of the combustion devices relative to the first mode and not in the secondary combustion zone of any of the plurality of the combustion devices.

5. The gas turbine engine combustion system of claim 4 wherein the controller is operable in a third mode providing a third power output greater than the second power output with combustion in the primary combustion zone of all of the combustion devices and in the secondary combustion zone of one or more of the plurality of the combustion devices.

6. The gas turbine engine combustion system of claim 2 wherein the controller is operable to increase engine power by successively turning on pairs of secondary combustion zones until all secondary combustion zones are ignited.

7. The gas turbine engine combustion system of claim 2 wherein the controller is operable to regulate emissions by turning secondary combustion zones on and off.

8. The gas turbine engine combustion system of claim 2 wherein the controller is operable to regulate overall combustion temperature by turning secondary combustion zones on and off.

\* \* \* \* \*